US006032004A

United States Patent [19]
Mirabella, Jr. et al.

[11] Patent Number: 6,032,004
[45] Date of Patent: Feb. 29, 2000

[54] INTEGRAL SAFETY INTERLOCK LATCH MECHANISM

[75] Inventors: Charles J. Mirabella, Jr., Rochester; Robert H. Alexander, Jr., Fairport, both of N.Y.

[73] Assignee: Xerox Corporation, Stamford, Conn.

[21] Appl. No.: 09/004,256

[22] Filed: Jan. 8, 1998

[51] Int. Cl.[7] ............................................. G03G 15/00
[52] U.S. Cl. ................................... 399/90; 324/207.2
[58] Field of Search .............................. 49/31; 200/51.09, 200/51.12, 61.62, 321; 324/207.2; 399/90

[56] References Cited

U.S. PATENT DOCUMENTS

| | | | |
|---|---|---|---|
| 3,815,990 | 6/1974 | Newcomb et al. | 399/21 |
| 3,971,337 | 7/1976 | Hastings | 118/629 |
| 4,795,087 | 1/1989 | Procak | 232/7 |
| 4,812,674 | 3/1989 | Sue et al. | 307/116 |
| 4,917,414 | 4/1990 | Boulanger | 292/98 |
| 5,062,668 | 11/1991 | Onderaka et al. | 292/25 |
| 5,216,246 | 6/1993 | Weldman et al. | 250/229 |
| 5,590,809 | 1/1997 | Prescott et al. | 221/1 |

FOREIGN PATENT DOCUMENTS 406050036A  2/1994  Japan .

OTHER PUBLICATIONS

JP362069277A, Tamura, Takashi, 'Copying Machine with Interlock Switch', Mar. 30, 1987.
United States Statutory Invention Registration: Reg. No. H43, Published Apr. 1, 1986 Inventor: Michaels.

*Primary Examiner*—William Royer
*Assistant Examiner*—William A. Noe
*Attorney, Agent, or Firm*—Kevin R. Kepner

[57] ABSTRACT

An interlock/latch system for a machine cover, particularly for an electrophotographic printing machine. A cover latch is provided with a latching mechanism and a set of electrical contacts which are mechanically closed when the cover is closed and the latch engaged. A sensor such as a Hall-Effect sensor is mounted in close proximity to the latch. A magnet in the cover actuates the Hall-Effect sensor when the cover is closed and latched sending a signal to the machine controller. The machine controller prohibits operation of the machine until the signal is received.

6 Claims, 3 Drawing Sheets

INTEGRAL SAFETY INTERLOCK LATCH MECHANISM

This invention relates generally to a latch mechanism for an electrophotographic printing machine, and more particularly concerns a latch having an integral safety interlock device for an electrophotographic printing machine.

In a typical electrophotographic printing process, a photoconductive member is charged to a substantially uniform potential so as to sensitize the surface thereof. The charged portion of the photoconductive member is exposed to a light image of an original document being reproduced. Exposure of the charged photoconductive member selectively dissipates the charges thereon in the irradiated areas. This records an electrostatic latent image on the photoconductive member corresponding to the informational areas contained within the original document. After the electrostatic latent image is recorded on the photoconductive member, the latent image is developed by bringing a developer material into contact therewith. Generally, the developer material comprises toner particles adhering triboelectrically to carrier granules. The toner particles are attracted from the carrier granules to the latent image forming a toner powder image on the photoconductive member. The toner powder image is then transferred from the photoconductive member to a copy sheet. The toner particles are heated to permanently affix the powder image to the copy sheet.

Various techniques have been used to minimize operator exposure to safety hazards such as moving parts, electrical charge or chemicals during machine operation. In this regard the use of safety interlock switches to inhibit machine operation with covers or doors open with the related exposure to safety hazards is well known in the prior art. For example, in current use are plunger type switches in which an electrical contact is changed by the movement of the plunger in response to the movement of the door or cover. See also the magnetic type switch units such as disclosed in U.S. Statutory Invention Registration H43 published Apr. 1, 1986.

A difficulty with the prior art devices is the relative ease in which interlock switches can be cheated or rigged in order to inhibit the appropriate signal from being conveyed when a door or cover is opened. For example, in a plunger type switch, a foreign object can be inserted between contacts to simulate that a cover is closed, when, in fact, the cover is open.

It is desirable, therefore, to provide a new and improved interlock switch that is not easily cheatable yet can be easily integrated into an existing system. Still another object of the present invention is to provide an interlock switch that is physically secured and located in the machine to prevent tampering and to inhibit false signals. Further advantages of the present invention will become apparent as the following description proceeds and the features characterizing the invention will be pointed out with particularity in the claims annexed to and forming a part of this specification.

The following disclosures may be relevant to various aspects of the present invention:

U.S. Pat. No. 5,126,246

Inventor: Weldman et al.

Issued: Jun. 1, 1993

US-A-H 43

Inventor: Michaels

Published: Apr. 1, 1986

Some relevant portions of the foregoing disclosures may be briefly summarized as follows:

U.S. Pat. No. 5,216,246 discloses an interlock system for a machine cover including an optical sensor providing a cover open signal, a housing secured to the cover and defining a hollow cavity communicating with the optical path with the cover closed, a reflector fixed to one end of the cavity to reflect light to the sensor with the cover closed, a wall forming part of the housing and disposed in an interference relationship with the optical path for blocking light with the cover open, the length of the optical path with the cover open being less than the length of the optical path with the cover closed, and circuitry to trigger the optical sensor to provide light pulses at a predetermined frequency.

In accordance with one aspect of the present invention, there is provided an interlock system for a printing machine with a cover having open and closed position comprising a latch mechanism, said latch mechanism having an open and a closed position, an electrical contact cooperating with said latch mechanism so that said contact is closed when said latch mechanism is closed, an interlock device adjacent said latch mechanism, said interlock device generating a signal when said latch mechanism is closed and a machine controller to receive said interlock signal, said machine controller prohibiting operation of the machine until the signal is received.

US-A-H 43 discloses a magnetic reed switch which is utilized to signal a cover open condition for a document handler in a printing machine.

Pursuant to another aspect of the present invention, there is provided a machine interlock system for a movable element of the machine comprising a latch mechanism for securing the movable element, said latch mechanism having an open and a closed position, an electrical contact cooperating with said latch mechanism so that said contact is closed when said latch mechanism is closed, an interlock device adjacent said latch mechanism, said interlock device generating a signal when said latch mechanism is closed and a machine controller to receive said interlock signal, said machine controller prohibiting operation of the machine until the signal is received.

Other features of the present invention will become apparent as the following description proceeds and upon reference to the drawings, in which.

Figure 1:
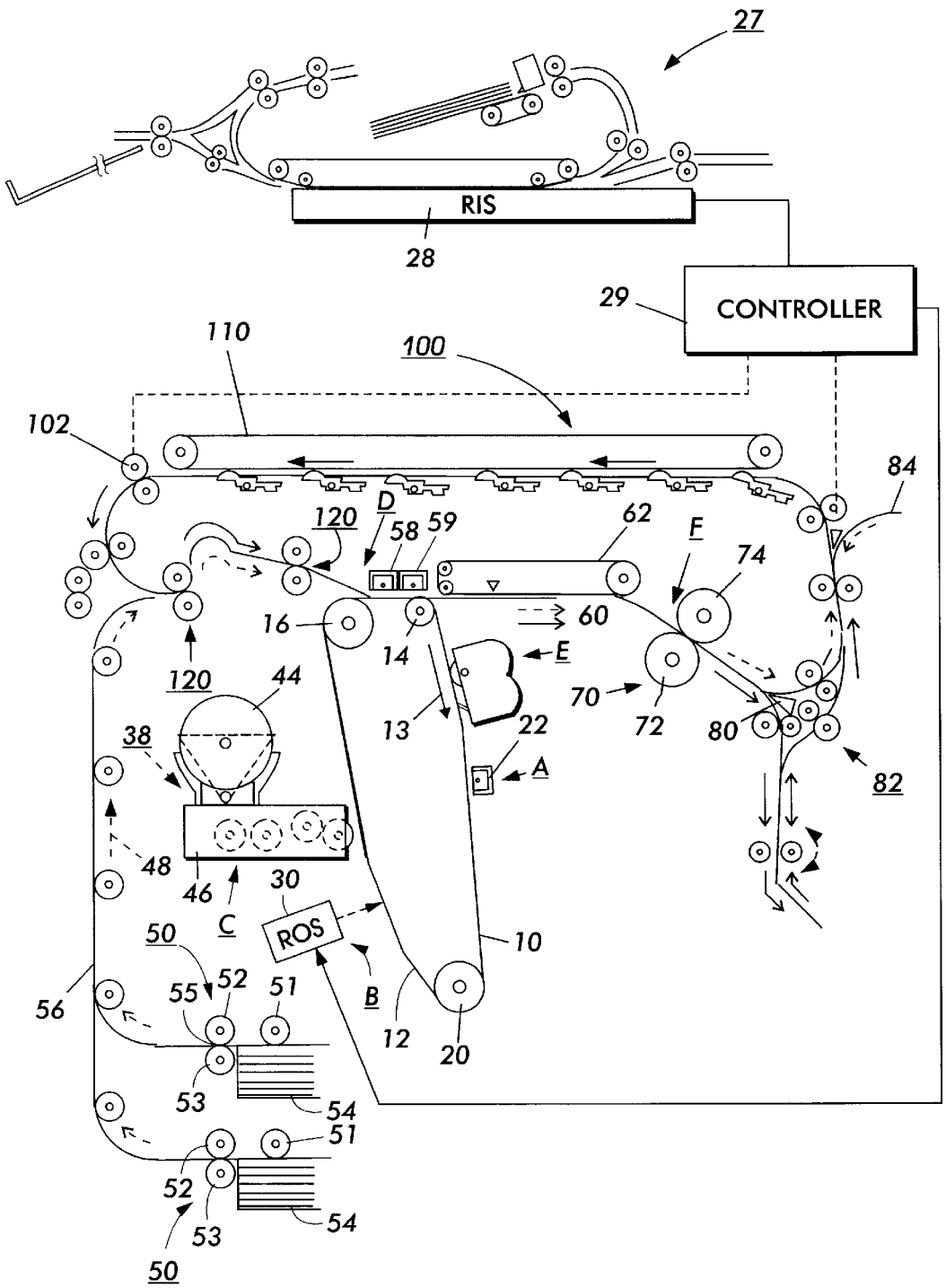
FIG. 1 is a schematic view of an electrophotographic printing machine.
Figure 3:
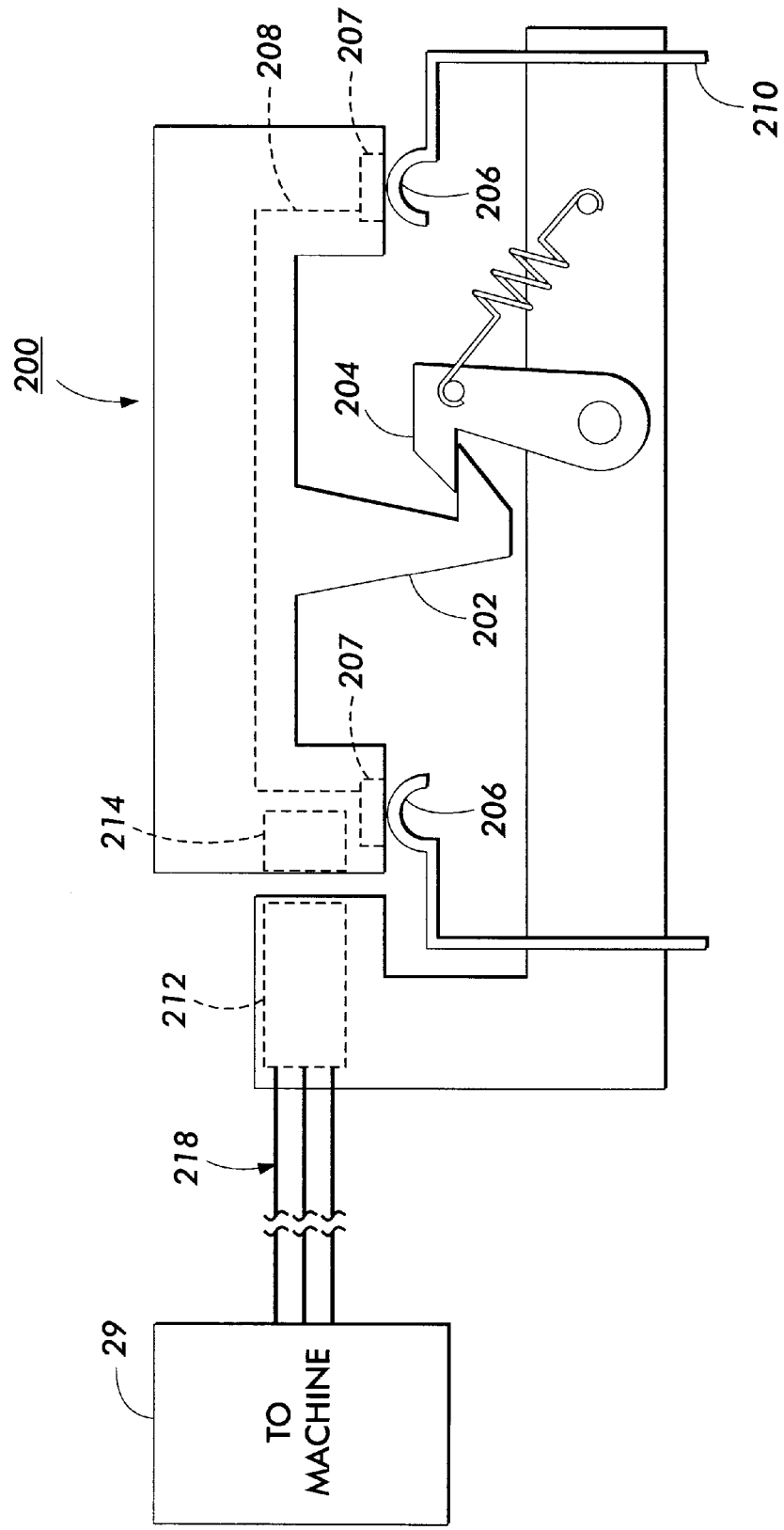

FIG. 3 is a detailed side view of the interlock/latch mechanism of the invention herein and For a general understanding of the features of the present invention, reference is made to the drawings. In the drawings, like reference numerals have been used throughout to identify identical elements. FIG. 1 schematically depicts an electrophotographic printing machine incorporating the features of the present invention therein. It will become evident from the following discussion that the interlock-system device of the present invention may be employed in a wide variety of devices and is not specifically limited in its application to the particular embodiment depicted herein.

Referring to FIG. 1 of the drawings, an original document is positioned in a document handler 27 on a raster input scanner (RIS) indicated generally by reference numeral 28. The RIS contains document illumination lamps, optics, a mechanical scanning drive and a charge coupled device (CCD) array. The RIS captures the entire original document and converts it to a series of raster scan lines. This information is transmitted to an electronic subsystem (ESS) which controls a raster output scanner (ROS) described below.

FIG. 1 schematically illustrates an electrophotographic printing machine which generally employs a photoconductive belt 10. Preferably, the photoconductive belt 10 is made from a photoconductive material coated on a ground layer, which, in turn, is coated on an anti-curl backing layer. Belt 10 moves in the direction of arrow 13 to advance successive portions sequentially through the various processing stations disposed about the path of movement thereof. Belt 10 is entrained about stripping roller 14, tensioning roller 16 and drive roller 20. As roller 20 rotates, it advances belt 10 in the direction of arrow 13.

Initially, a portion of the photoconductive surface passes through charging station A. At charging station A, a corona generating device indicated generally by the reference numeral 22 charges the photoconductive belt 10 to a relatively high, substantially uniform potential.

At an exposure station, B, a controller or electronic subsystem (ESS), indicated generally by reference numeral 29, receives the image signals representing the desired output image and processes these signals to convert them to a continuous tone or greyscale rendition of the image which is transmitted to a modulated output generator, for example the raster output scanner (ROS), indicated generally by reference numeral 30. Preferably, ESS 29 is a self-contained, dedicated minicomputer. The image signals transmitted to ESS 29 may originate from a RIS as described above or from a computer, thereby enabling the electrophotographic printing machine to serve as a remotely located printer for one or more computers. Alternatively, the printer may serve as a dedicated printer for a high-speed computer. The signals from ESS 29, corresponding to the continuous tone image desired to be reproduced by the printing machine, are transmitted to ROS 30. ROS 30 includes a laser with rotating polygon mirror blocks. The ROS will expose the photoconductive belt to record an electrostatic latent image thereon corresponding to the continuous tone image received from ESS 29. As an alternative, ROS 30 may employ a linear array of light emitting diodes (LEDs) arranged to illuminate the charged portion of photoconductive belt 10 on a raster-by-raster basis.

After the electrostatic latent image has been recorded on photoconductive surface 12, belt 10 advances the latent image to a development station, C, where toner, in the form of liquid or dry particles, is electrostatically attracted to the latent image using commonly known techniques. The latent image attracts toner particles from the carrier granules forming a toner powder image thereon. As successive electrostatic latent images are developed, toner particles are depleted from the developer material. A toner particle dispenser, indicated generally by the reference numeral 44, dispenses toner particles into developer housing 46 of developer unit 38.

With continued reference to FIG. 1, after the electrostatic latent image is developed, the toner powder image present on belt 10 advances to transfer station D. A print sheet 48 is advanced to the transfer station, D, by a sheet feeding apparatus, 50. Preferably, sheet feeding apparatus 50 includes a nudger roll 51 which feeds the uppermost sheet of stack 54 to nip 55 formed by feed roll 52 and retard roll 53. Feed roll 52 rotates to advance the sheet from stack 54 into vertical transport 56. Vertical transport 56 directs the advancing sheet 48 of support material into the registration transport 120 of the invention herein, described in detail below, past image transfer station D to receive an image from photoreceptor belt 10 in a timed sequence so that the toner powder image formed thereon contacts the advancing sheet 48 at transfer station D. Transfer station D includes a corona generating device 58 which sprays ions onto the back side of sheet 48. This attracts the toner powder image from photoconductive surface 12 to sheet 48. The sheet is then detacked from the photoreceptor by corona generating device 59 which sprays oppositely charged ions onto the back side of sheet 48 to assist in removing the sheet from the photoreceptor. After transfer, sheet 48 continues to move in the direction of arrow 60 by way of belt transport 62 which advances sheet 48 to fusing station F.

Fusing station F includes a fuser assembly indicated generally by the reference numeral 70 which permanently affixes the transferred toner powder image to the copy sheet. Preferably, fuser assembly 70 includes a heated fuser roller 72 and a pressure roller 74 with the powder image on the copy sheet contacting fuser roller 72. The pressure roller is cammed against the fuser roller to provide the necessary pressure to fix the toner powder image to the copy sheet. The fuser roll is internally heated by a quartz lamp (not shown). Release agent, stored in a reservoir (not shown), is pumped to a metering roll (not shown). A trim blade (not shown) trims off the excess release agent. The release agent transfers to a donor roll (not shown) and then to the fuser roll 72.

The sheet then passes through fuser 70 where the image is permanently fixed or fused to the sheet. After passing through fuser 70, a gate 80 either allows the sheet to move directly via output 84 to a finisher or stacker, or deflects the sheet into the duplex path 100, specifically, first into single sheet inverter 82 here. That is, if the sheet is either a simplex sheet, or a completed duplex sheet having both side one and side two images formed thereon, the sheet will be conveyed via gate 80 directly to output 84. However, if the sheet is being duplexed and is then only printed with a side one image, the gate 80 will be positioned to deflect that sheet into the inverter 82 and into the duplex loop path 100, where that sheet will be inverted and then fed to acceleration nip 102 and belt transports 110, for recirculation back through transfer station D and fuser 70 for receiving and permanently fixing the side two image to the backside of that duplex sheet, before it exits via exit path 84.

After the print sheet is separated from photoconductive surface 12 of belt 10, the residual toner/developer and paper fiber particles adhering to photoconductive surface 12 are removed therefrom at cleaning station E. Cleaning station E includes a rotatably mounted fibrous brush in contact with photoconductive surface 12 to disturb and remove paper fibers and a cleaning blade to remove the nontransferred toner particles. The blade may be configured in either a wiper or doctor position depending on the application. Subsequent to cleaning, a discharge lamp (not shown) floods photoconductive surface 12 with light to dissipate any residual electrostatic charge remaining thereon prior to the charging thereof for the next successive imaging cycle.

The various machine functions are regulated by controller 29. The controller is preferably a programmable microprocessor which controls all of the machine functions hereinbefore described. The controller provides a comparison count of the copy sheets, the number of documents being recirculated, the number of copy sheets selected by the operator, time delays, jam corrections, etc. The control of all of the exemplary systems heretofore described may be accomplished by conventional control switch inputs from the printing machine consoles selected by the operator. Conventional sheet path sensors or switches may be utilized to keep track of the position of the document and the copy sheets.

It is believed that the foregoing description is sufficient for the purposes of the present application to illustrate the general operation of a printing machine.

In a machine such as that described above there are various high voltage and mechanical pinch points that can be very dangerous to a person unfamiliar with the operation of such a machine. Additionally, such a machine may require a controlled environment with respect to cooling airflows, dust and dirt removal systems and even temperature and humidity control for optimum machine operation. Accordingly, the covers that enclose these machines often have sensor mechanisms which disable the machine if a cover is not properly closed. In some instances regulatory agencies and/or manufacturers' policies prohibit software lockouts or interlocks and an actual deenergization is required.

In most interlock systems, a given state of a sensing device corresponds to a given state of the system. For example, a closed cover actuates a switch which creates a low state signal for the control system. When the cover is open, the switch de-actuates and creates a high state signal for the control system. In this traditional system, one state of the system (cover open or cover closed) corresponds to a single state of a suitable sensing device. Unfortunately, machine operators have discovered in the use of traditional interlock systems that unplugging a device creates the one state and shorting the correct wires of the device (i.e. signal to ground) creates the other state. Trial and error eventually yields the state that satisfies the control system's requirements and the interlock can be bypassed.

Figure 2:
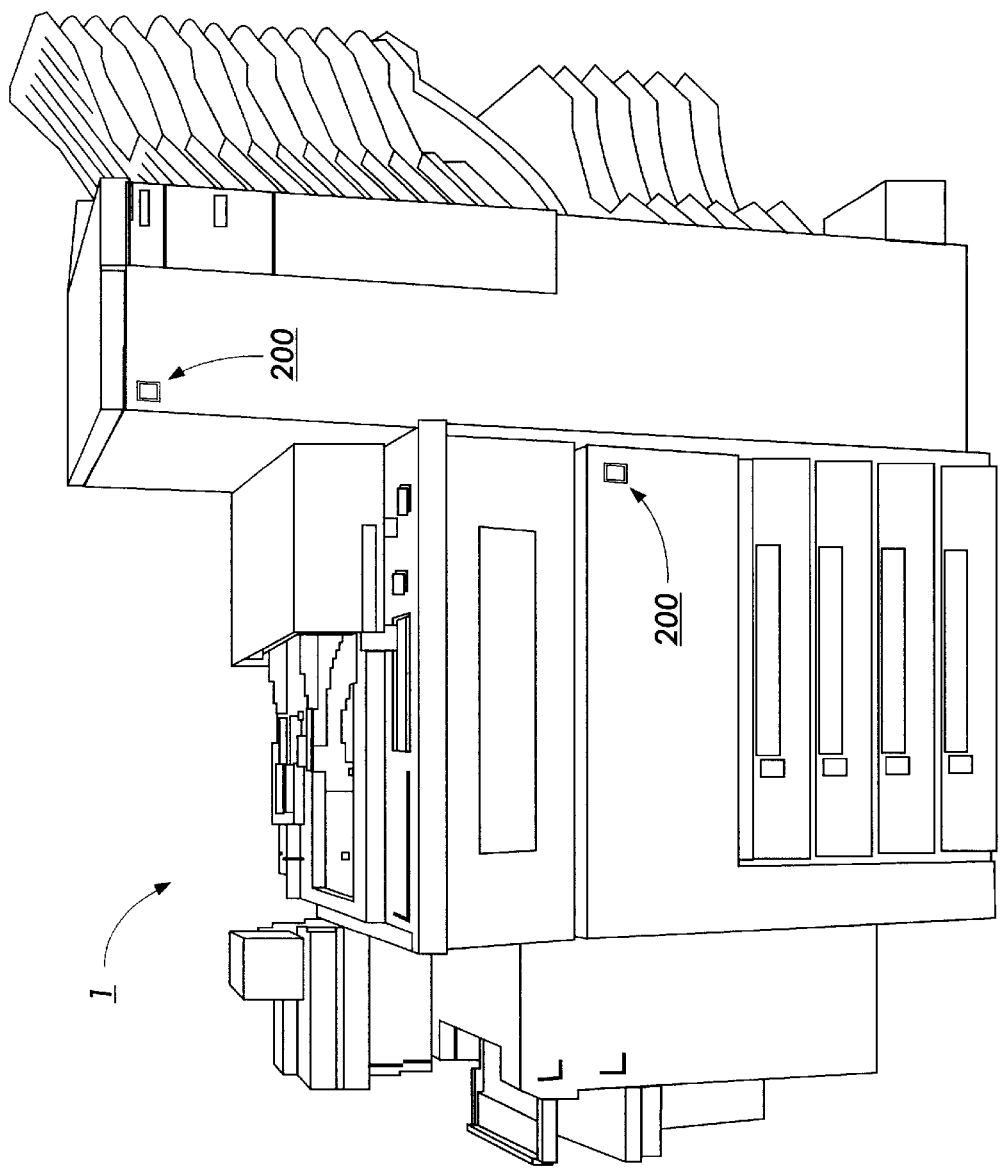
FIG. 2 is an elevational view of the FIG. 1 printing machine illustrating the covers installed on the machine.

Thus, the necessity for a deenergizing interlock that cannot be easily bypassed by a user is required. Turning to FIG. 2, there is illustrated a schematic elevational view of a multi-cover electrophotographic printing machine 1. The latch/interlock positions are generally indicated by the reference numeral 200. Each of these latch/interlock assemblies 200 must be in the closed and latched position to close the operating circuit for the machine.

Turning next to FIG. 3, detailed front and side views of the latch/interlock device 200 are illustrated. The latching mechanism includes a mechanical catch and latch which cooperate to hold a cover in the closed position. The latch further includes a set of contacts 206 which must be mated with contacts 207 and complete the circuit through path 208 by the mechanical engagement of the catch 202 and latch 204 to allow the machine operating circuit 210 to be energized. The interlock is provided by a solid state Hall-Effect sensor 212 located in one portion of the latching mechanism. Unless a magnet 214 located in the cover portion of the latch is brought into close proximity of the Hall-Effect sensor by the mechanical engagement of the latch, the interlock circuit 218 will not close to send a signal to the machine controller 29. The solid state non-moving part Hall-Effect sensor allows for a very robust operating life in the millions of cycles. Of course it is possible to use any magnetic type sensor in combination with the latching mechanism to accomplish the dual interlock described herein.

The combination of the mechanical closing of the electrical operating circuit contacts 206, 207 in conjunction with the requirement for the Hall-Effect signal to the machine controller 29 provides a dual interlock which is very difficult to cheat or bypass. Of course specially manufactured keys will be made available to allow technical reps to service the machines and operate the machine with the cover or covers open when necessary. The interlock/latch device has been illustrated in use with a machine cover, however, it can be readily seen that such a device can be used with any movable machine element having a latching device.

In recapitulation, there is provided an interlock/latch system for a machine cover, particularly for an electrophotographic printing machine. A cover latch is provided with a latching mechanism and a set of electrical contacts which are mechanically closed when the cover is closed and the latch engaged. A sensor such as a Hall-Effect sensor is mounted in close proximity to the latch. A magnet in the cover actuates the Hall-Effect sensor when the cover is closed and latched sending a signal to the machine controller. The machine controller prohibits operation of the machine until the signal is received.

It is, therefore, apparent that there has been provided in accordance with the present invention, a safety interlock latch that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. An interlock system for a printing machine with a cover having open and closed positions comprising:

a latch mechanism, said latch mechanism having an open and a closed position;

an electrical contact cooperating with said latch mechanism so that said contact is closed when said latch mechanism is closed;

an interlock device adjacent said latch mechanism, said interlock device generating a signal when said latch mechanism is closed;

a machine controller to receive said signal from said interlock device, said machine controller prohibiting operation of the machine until the signal is received, which signal must be received contemporaneously with the closing of said electrical contact to enable machine operation.

2. The interlock system of claim 1 wherein said interlock device comprises:

a Hall-Effect sensor mounted adjacent said latch mechanism;

a magnet mounted on the cover such that when the cover is closed and latched said magnet is in the immediate vicinity of said Hall-Effect sensor.

3. The interlock system of claim 1 wherein said interlock device comprises:

a magnet mounted adjacent said latch mechanism;

a Hall-Effect sensor mounted on the cover such that when the cover is closed and latched said magnet is in the immediate vicinity of said Hall-Effect sensor.

4. A machine interlock system for a movable element of a machine comprising:

a latch mechanism for securing the movable element, said latch mechanism having an open and a closed position;

an electrical contact cooperating with said latch mechanism so that said contact is closed when said latch mechanism is closed;

an interlock device adjacent said latch mechanism, said interlock device generating a signal when said latch mechanism is closed;

a machine controller to receive said signal from said interlock device said machine controller prohibiting operation of the machine until the signal is received, which signal must be received contemporaneously with the closing of said electrical contact to enable machine operation.

5. The interlock system of claim 4 wherein said interlock device comprises:
- a Hall-Effect sensor mounted adjacent said latch mechanism;
- a magnet mounted on the movable element such that when the movable element is closed and latched said magnet is in the immediate vicinity of said Hall-Effect sensor.

6. The interlock system of claim 4 wherein said interlock device comprises:
- a magnet mounted adjacent said latch mechanism;
- a Hall-Effect sensor mounted on the movable element such that when the movable element is closed and latched said magnet is in the immediate vicinity of said Hall-Effect sensor.

* * * * *